United States Patent
Anand et al.

(10) Patent No.: US 7,721,250 B2
(45) Date of Patent: May 18, 2010

(54) SYSTEM AND METHOD FOR INTERACTIVE AND INTEGRATED SOFTWARE DEVELOPMENT PROCESS AND PHASES

(75) Inventors: Ashok Anand, Delhi (IN); Amitkumar Manoharrao Paradkar, Mohegan Lake, NY (US); Donald P. Pazel, Montrose, NY (US); Beth R. Tibbitts, Lexington, KY (US); Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 11/402,007

(22) Filed: Apr. 12, 2006

(65) Prior Publication Data

US 2007/0245322 A1    Oct. 18, 2007

(51) Int. Cl.
G06F 9/44     (2006.01)
G06F 9/45     (2006.01)

(52) U.S. Cl. .................. 717/100; 717/101; 717/102

(58) Field of Classification Search ......... 717/124–127, 717/168–177, 101–102
See application file for complete search history.

(56) References Cited

U.S. PATENT DOCUMENTS

| | | | | |
|---|---|---|---|---|
| 4,696,003 | A * | 9/1987 | Kerr et al. | 714/38 |
| 5,220,658 | A * | 6/1993 | Kerr et al. | 703/22 |
| 5,729,746 | A * | 3/1998 | Leonard | 717/101 |
| 5,794,045 | A * | 8/1998 | Schell et al. | 717/131 |
| 5,845,077 | A * | 12/1998 | Fawcett | 709/221 |
| 6,003,037 | A * | 12/1999 | Kassabgi et al. | 707/103 R |
| 6,199,193 | B1 * | 3/2001 | Oyagi et al. | 717/101 |
| 6,212,675 | B1 * | 4/2001 | Johnston et al. | 717/107 |
| 6,272,674 | B1 * | 8/2001 | Holiday, Jr. | 717/174 |
| 6,823,313 | B1 * | 11/2004 | Yuchimiuk et al. | 704/275 |
| 7,051,211 | B1 * | 5/2006 | Matyas et al. | 713/187 |
| 7,174,536 | B1 * | 2/2007 | Kothari et al. | 717/109 |
| 7,191,439 | B2 * | 3/2007 | Donaldson et al. | 717/178 |
| 7,246,351 | B2 * | 7/2007 | Bloch et al. | 717/175 |
| 7,284,167 | B2 * | 10/2007 | Lee et al. | 714/718 |
| 7,401,331 | B2 * | 7/2008 | Leung | 717/168 |
| 7,500,237 | B1 * | 3/2009 | Saiyed et al. | 717/174 |
| 7,548,915 | B2 * | 6/2009 | Ramer et al. | 707/5 |
| 7,559,059 | B2 * | 7/2009 | Renaud | 717/174 |

OTHER PUBLICATIONS

Roudaki et al, "INteractive software development using workflow", IEEE, pp. 3-7, 2009.*

(Continued)

*Primary Examiner*—Anil Khatri
(74) *Attorney, Agent, or Firm*—McGinn IP Law Group, PLLC

(57) ABSTRACT

A system (and method, and method for deploying computing infrastructure) for facilitating fixing program development errors found during different phases of program development using different programming tools, such as compilers, linkers, library managers, and debuggers, and can be integrated into a program development environment encompassing all tools. The exemplary aspects of the present invention can detect a qualified set of problems from which to recover with sufficient information, as typically provided by a user or other intelligent or artificial intelligent means, and upon error detection, can initiate a communication with the user (or other support software), to acquire information that could remedy the problem.

16 Claims, 7 Drawing Sheets

OTHER PUBLICATIONS

Sendall, "Domain driven software development a world of transformation", IEEE RSP, pp. 1-3, 2004.*
Kaewakasi et al, "A distributed dynamic aspect machine for scientific software development", ACM VMIL, pp. 1-5, 2007.*
Yu et al, "A goal oriented development tool to automate the incorporation of intelligent agents into interactive digital media applications", ACM Computer in Entertainment, vol. 6, No. 2, article 24, pp. 1-15, 2008.*
Slyngstad et al, "An emprical study of developers views on software reuse in statoil ASA", ACM ISESE, pp. 242-251, 2006.*
Zuma et al, "Interactive software development tool: ISDT", IEEE, 153-162, 1981.*

* cited by examiner

SYSTEM AND METHOD FOR INTERACTIVE AND INTEGRATED SOFTWARE DEVELOPMENT PROCESS AND PHASES

BACKGROUND OF THE INVENTION

1. Field of the Invention

The present invention generally relates to a system and method for computer program development, program development tools, and program development environments. More particularly, the present invention relates to means for fixing program errors as provided by program development tools, and more particularly, to a system and method that focuses on the practice of program development in building a program across a number of programming tools, whereupon the errors are reviewed, and the errors are fixed. The present invention includes, for example, a method by which errors during program development are better identified and resolved through error coordination and immediate interactive resolution, improving in time and efficacy the program development process.

2. Description of the Conventional Art

The relationship between programmer and programming tools has essentially remained unchanged in this following aspect: the user executes a programming tool, for example, a compiler, against a body of programming artifacts such as source code or binary output from other phases. The practitioner then reviews potentially extensive error summaries, and selectively and appropriately fixes errors through such means as a text editor. Typically, this applies to the application of one tool at a time, and in many cases, to a single programming artifact, e.g. source file, at a time.

The issue being raised, in the context of the technology so described, is that error management by programming tools or their encompassing environment has been negligible. Typically, as each tool runs, errors are gathered into a list, and simply displayed in total to the user, and for the user to ferret out. As a result, practitioners face the following typical problems:

Many errors indicate simple omissions, such as missing include files. However, a large number of errors are generated based on that missing information, as the compiler carries to completion.

Many variable naming issues have a simple solution. So, when an illegal or conflicting name is used in a program, it is only post-facto. It would be better if a name could be checked for legality or conflict before or during compilation. Similar situations occur in, for example, renaming a C++ class, a variable, a method, a data field, etc.

Linker problems with unresolved symbols often are related to unspecified libraries. Associating the missing routine to a library is often difficult. At the same time, the practitioner deals with this in the context of all missing library messages, which is difficult to deal with.

Linker errors, such as unresolved symbols, are often based on misspellings or case problems. Since linking does not deal with source code, there is little help in relating the error to the source, especially in the case of name mangling, as often found in C++.

Other classes of errors can be classified as limitations which arise generally from configurations and ancillary input leveraged against individual tools participating in a program development. Such configuration information includes, but is not restricted to, error filtering settings, levels of optimization, and paths to source and libraries. These limitations can be further decomposed into either functional or non-functional limitation errors.

For purposes of this disclosure, functional errors include, for example, incorrect specifications to the development tools such as incorrect files, library locations, or general tool settings related to the specific program development.

For purposes of this disclosure, non-functional errors derive from tool behavioral anomalies despite correct input specification. These can include, for example, performance, excessive computation, etc., which are usually remediated through alternative configurations. For example, optimization levels for compilation may be technically correct, but incur significant computation overhead. Optimization at lesser levels may be sufficient for the developing application while speeding up the build compilations.

In many of these cases, the end user typically endures a potentially large set of repetitious, predictable, but unrelated errors. In many cases, problems span programming tools, and in such cases, the practitioner must deduce that the fix should be applied at earlier phases.

SUMMARY OF THE INVENTION

In view of the foregoing and other exemplary problems, drawbacks, and disadvantages of the conventional methods and structures, an exemplary feature of the present invention is to provide a system, method, and framework for computer program development, program development tools, and program development environments. More particularly, the present invention relates to means for fixing program errors as provided by program development tools, and more particularly, to a system and method that focuses on the practice of program development in building a program across a number of programming tools, whereupon the errors are reviewed, and the errors are fixed.

The present invention exemplarily describes this activity in the context of a computer program development execution cycle, or simply "execution cycle", wherein a subset of software tools is executed in some determined order, wherein one or more tools of such subset of tools produce errors. The present invention includes, for example, a method by which errors during a program development cycle are better identified and resolved through error coordination and immediate interactive resolution, improving in time and efficacy the program development process.

One exemplary aspect of the present invention provides a method and apparatus that facilitates fixing (i.e., repairing, correcting) program development errors found during different phases of program development using different programming tools. An exemplary aspect of the present invention applies across program development tools, such as compilers, linkers, library managers, and debuggers, and can be integrated into a program development environment encompassing all tools. The exemplary aspects of the present invention being applied to these tools, and exemplarily described herein, can be based on the tool's ability to detect a qualified set of problems from which it could recover with sufficient information, as typically provided by a user or other intelligent or artificial intelligent means. Characteristically, upon error detection, the tool can initiate a communication with the user (or other support software), to acquire information that could remedy the problem. To assist towards a sound, expeditious, and thorough fix, the tool can highlight alternatives for a problem fix (e.g., alternatives can include sets/libraries; additional field names in a structures/classes, etc., in contrast to altering an existing potentially misspelled date field name), and also structured problem skipping (e.g., inserting comments and temporary placeholder "TODOs", etc.). On input or selections to these choices, the tool can fix the problems, relative to any aspects of its runtime state, and alternatively, can fix related files or scripts related to that problem using the provided information.

The exemplary features of the present invention can provide a flexible and versatile solution that can be applied to many programming tools, such as linkers, library builders, library managers, debuggers, program editors, etc. Although the exemplary features of the present invention can be suited, for example, to program development environments with graphical user interfaces, the scope of this teaching is not dependent on such supporting frameworks.

In one exemplary aspect of the invention, a method (e.g., a computer-implemented method) for integrated software processes in an interactive software system, including remediating an execution cycle of the interactive software system based on identified analytical information from the software processes in the interactive software system prior to a completion of the execution cycle of the interactive software system. The exemplary method can include identifying the analytical information from the software processes in the interactive software system prior to the completion of the execution cycle of the interactive software system.

The analytical information can include at least one of a program development error and a limitation prior to completion of the execution cycle of the interactive software system. The method can include detecting a predetermined set of problems for which information can be obtained to remedy at least one of the problems prior to the completion of the execution cycle of the interactive software system. The exemplary method can initiate communication with at least one of a user and support software to obtain the information to remedy one of the problems prior to the completion of execution cycle of the interactive software system. The exemplary method can continue the execution cycle of the interactive software system after performing the remediating.

In another exemplary aspect of the invention, the method can identify at least one of a functional program development limitation and a non-functional program development limitation during different phases of the execution cycle of the interactive software system, and interactively repair the at least one of the functional program development limitation and the non-functional program development limitation at the different phases of the execution cycle of the interactive software system.

According to an exemplary method, an error policy can be applied to the identified analytical information, and upon acceptance of the identified analytical information according to a qualification by the error policy, an error remediation of the error policy can be applied to fix the identified analytical information.

In another exemplary aspect of the invention, a computer-implemented method for programming tool engagement and enhancement in an interactive program development system, includes detecting a tool-specific condition prior to termination of an execution cycle of a programming tool, and engaging at least one of a user and a support software to obtain information related to the tool-specific condition. Based on a result of the engaging, the exemplary method can invoke ancillary means for processing the tool-specific condition, and continue execution of the programming tool after invoking the ancillary means for processing the tool-specific condition.

In another exemplary aspect of the invention, an interface can be provided for at least one of plugging in different system tools, allowing individual tool-user dialogs to be described to the method, and allowing standardized presentation of diverse dialogs via the interface.

In another exemplary aspect of the invention, an interactive software system for integrated software processes includes an identifying unit that identifies analytical information from the software processes in the interactive software system prior to the completion of an execution cycle of the interactive software system, and a remediating unit that remediates the execution cycle of the interactive software system based on the identified analytical information from the software processes in the interactive software system prior to a completion of the execution cycle of the interactive software system. The exemplary aspects of the system can include a communication unit that initiates communication with at least one of a user and support software to obtain the information to remedy one of the problems prior to the completion of execution cycle of the interactive software system.

In another exemplary aspect of the invention, an interactive software development system, including a plurality of programming tools, can include error detecting means for identifying a software development error prior to completion of an execution cycle of the software development, and error repairing means for repairing the software development error prior to the completion of the execution cycle of the software development. The exemplary aspects of the invention can include interface means for initiating communication with at least one of a user and a support software to obtain information to remedy the identified software development error prior to the completion of the execution cycle of the software development.

The programming tools according to the exemplary aspects of the invention can include at least one of a compiler, a linker, a library builder, a library manager, a debugger, and a program editor.

In another exemplary aspect of the invention, a method (e.g., a computer-implemented method) for programming tool engagement and enhancement in an interactive program development system including a plurality of programming tools, includes identifying a program development error prior to completion of an execution cycle of the program development, and repairing the program development error prior to the completion of the execution cycle of the program development.

In another exemplary aspect of the invention, a computer-implemented method for programming tool engagement and enhancement in an interactive program development system including a plurality of programming tools, includes detecting a tool-specific condition prior to termination of an execution cycle of a programming tool, engaging at least one of a user and a support software to obtain information related to the tool-specific condition, and based on a result of the engaging, invoking ancillary means for processing the tool-specific condition.

In yet another exemplary aspect of the invention, an interactive program development system for error detection and for soliciting suggested remediation of errors, including a plurality of programming tools, includes an error detecting unit that identifies a program development error prior to completion of an execution cycle of the program development, and an error repairing unit that repairs the program development error prior to the completion of the execution cycle of the program development.

In still another exemplary aspect of the invention, an interactive program development system that manages programming artifacts, including a plurality of programming tools, includes error detecting means for identifying a program development error prior to completion of an execution cycle of the program development, and error repairing means for repairing the program development error prior to the completion of the execution cycle of the program development.

Another exemplary aspect of the invention is directed to a signal-bearing medium tangibly embodying a program of recordable, machine-readable instructions executable by a digital processing apparatus to perform an exemplary method according to the present invention.

Yet another exemplary aspect of the invention is directed to a method of deploying computing infrastructure in which recordable, computer-readable code is integrated into a computing system, and combines with the computing system to perform the exemplary methods according to the present invention.

While the invention has been described in terms of several exemplary embodiments, those skilled in the art will recognize that the invention can be practiced with modification within the spirit and scope of the appended claims, and that other exemplary actions, decision-making criteria, and metrics can be employed according to the present invention.

BRIEF DESCRIPTION OF THE DRAWINGS

The foregoing and other exemplary purposes, aspects and advantages will be better understood from the following detailed description of an exemplary aspect of the invention with reference to the drawings, in which.

DETAILED DESCRIPTION OF EXEMPLARY ASPECTS OF THE INVENTION

Figure 1:
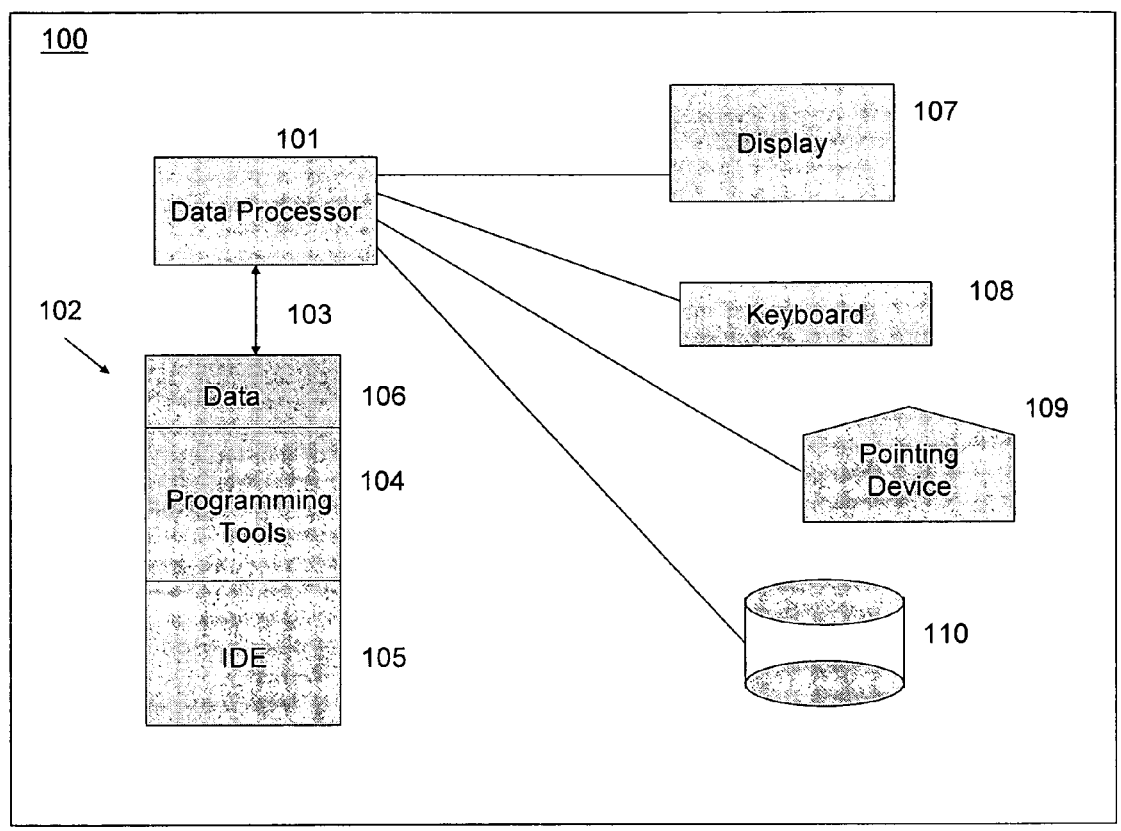
FIG. 1 exemplarily illustrates a block diagram of a data processing system 100 representative of the programming systems, according to an exemplary aspect of the present invention.

Referring now to the drawings, and more particularly to FIGS. 1-8, there are shown exemplary aspects of the method and structures according to the present invention.

The present invention generally relates to a system, method, and framework for computer program development, program development tools, and program development environments. More particularly, the present invention relates to means for fixing program errors as provided by program development tools, and more particularly, to a system and method that focuses on the practice of computer program development in building a program across a number of programming tools, whereupon the errors are reviewed, and the errors are fixed. The present invention includes, for example, a method by which errors during program development are better identified and resolved through error coordination and immediate interactive resolution, improving in time and efficacy the program development process.

The present invention relates to a method and apparatus for managing error messages detected by one or more programming tools, either within or outside of a computer program development environment. In an exemplary aspect, the programming tools can be included within a programming environment, and include common program development tools, such as but not restricted to, compilers, linkers, library managers, debuggers, program editors, etc.

Referring now to the drawings, and more particularly to FIG. 1, there is shown a block diagram of a data processing system 100 for computer program development according to an exemplary aspect of the present invention, as described above. In an exemplary aspect, the data processing system 100 can be, for example, an IBM® Intellistation® computer (IBM and Intellistation are both registered trademarks of International Business Machines Corporation).

However, other data processing systems 100 also can be contemplated for use by the exemplary aspects of the present invention. For example, the invention can be implemented using a plurality of separate electronic circuits or devices (e.g., hardwired electronic or logic circuits, or programmable logic devices such as PLDs, PLAs, PALs, or the like). A suitable programmed general purpose computer, e.g., a microprocessor, microcontroller or other processor device (CPU or MPU), either alone or in conjunction with one or more peripherals (e.g. integrated circuit) data and signal processing devices can be used to implement the invention. In general, any device or assembly of devices on which a finite state machine capable of implementing, for example, the flow charts exemplarily shown in the Figures can be used as a controller with the invention.

Referring again to FIG. 1, the data processing system 100 of exemplary aspects of the present invention can include a data processor 101 having a memory 102. The memory 102 can be coupled to the data processor 101 via a bidirectional bus 103. In an exemplary aspect, the memory 102 can include a program and a data memory. The memory also can include program development tools 104, compilers, linkers, and library managers, etc. It also can include an integrated program development environment (IDE) 105, which can invoke the program development tools 104. The memory 102 also can include data memory 106, for example, specifically data and objects related to the execution of the program development tools 104 and the IDE 105.

The IDE 105 can present information to the user on display 107, which can be coupled to the data processor 101. In an exemplary aspect of the invention, a user data entry device 108 (e.g. keyboard or other interactive device), and a pointing device 109, for example, a mouse or a trackball, can also be coupled to the data processor 101.

In an exemplary aspect of the invention, the display 107 can provide a presentation space for the IDE in order to display the pieces of a program being constructed. In other exemplary aspects, either the pointing device 108 or predefined keys of the data entry device 109 can be used to manipulate the data in conformity with the exemplary aspects of the present invention.

In an exemplary aspect of the invention, a persistent storage mechanism 110 can exist and can be utilized to store IDE and program piece information 106. This type of storage media can include, but is not limited to, standard disk drive technology, tape, or flash memory. In an exemplary aspect, the program information 106 can be both stored onto the persistent media, and/or retrieved by similar processing system 100 for execution.

Figure 2:
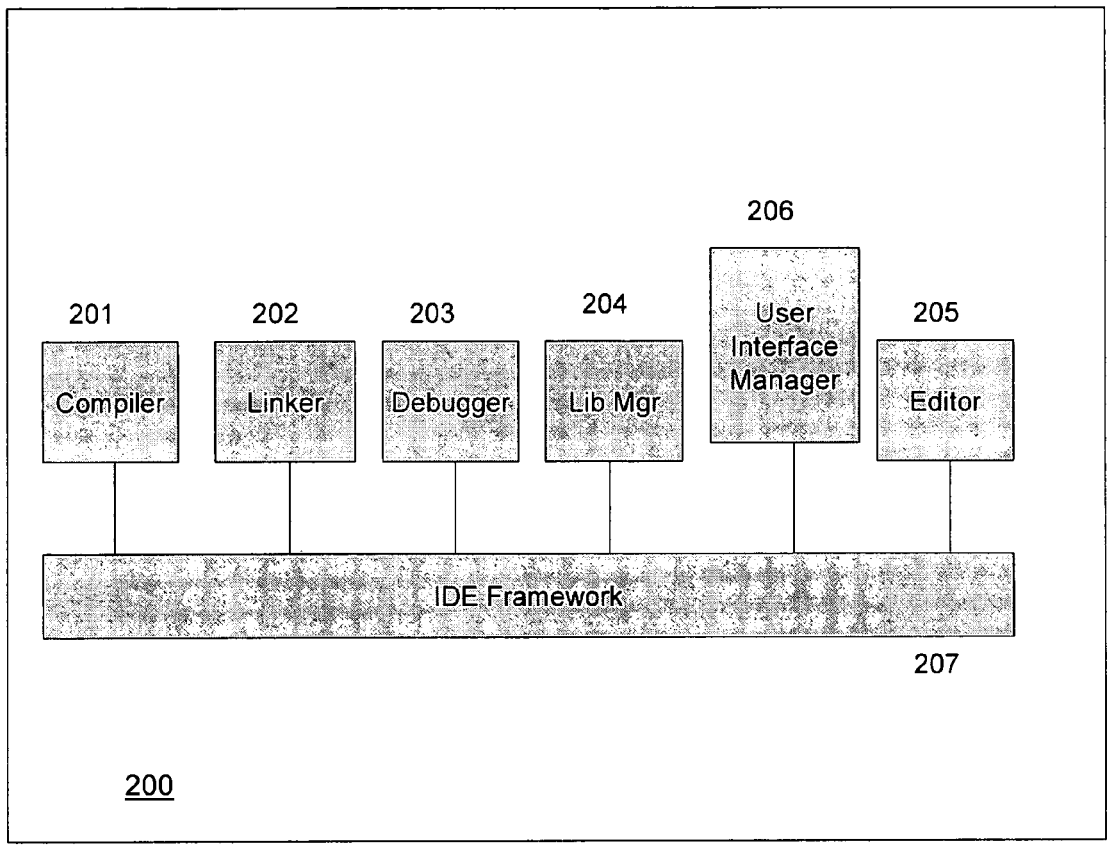
FIG. 2 exemplarily illustrates a block diagram of a program development environment 200, relating different components of the environment, and including programming tools executed by the environment, according to an exemplary aspect of the present invention.

FIG. 2 illustrates an overview 200 of the components of an exemplary interactive program development program, according to the exemplary aspects of the present invention. The environment exemplarily shows a set of commonly recognized program development tools, such as but not limited to, a compiler 201, a linker 202, a debugger 203, and a program library manager 204.

FIG. 2 also exemplarily shows a program editor 205, typically used as a processor for source code entry, but not restricted to that purpose. FIG. 2 also exemplarily shows a user interface manager 206 which coordinates different views on program artifacts such as source views, project views, build/make file views, and the like.

FIG. 2 also exemplarily shows an IDE framework component 207 which is a process which integrates the entire above mentioned components, coordinating their executions and collecting their outputs. The exemplary IDE framework can provide other functions such as program project management, file management, and sequences user activity.

Figure 3:
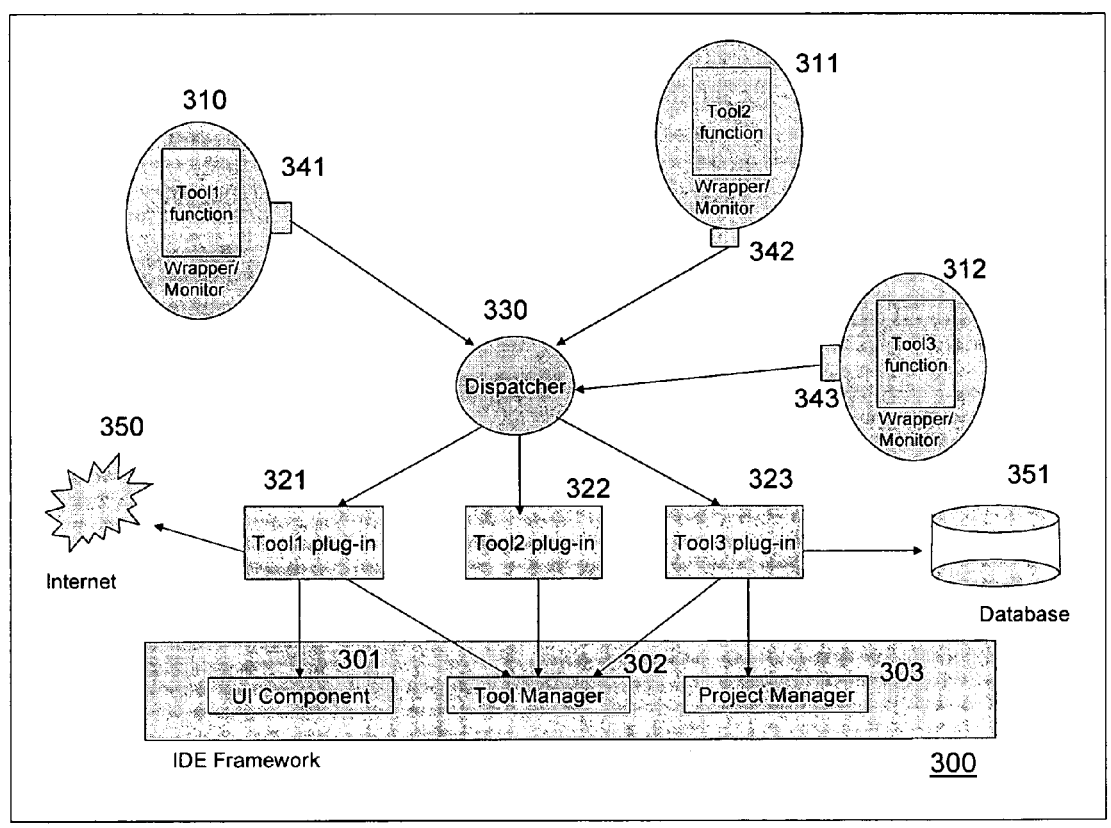
FIG. 3 exemplarily illustrates a block diagram of the component architecture 300, according to an exemplary aspect of the present invention.

FIG. 3 exemplarily shows the software components according to an exemplary aspect of an integrated development environment, according to the present invention. FIG. 3 exemplarily shows the IDE framework 300. The IDE framework exemplarily is shown to encompass three sub-components, namely a UI (user interface) component 301 which controls the visual or view coordination, a tool manager 302 which coordinates access and control of tools such as but not limited to compilers, linkers, debuggers, and library managers. The exemplary IDE also encompasses a project manager 303 for managing and consolidating all information that relates to the development of a specific user program. An exemplary IDE can contain any number of components such as, but not limited to these components, which are shown by way of example in teaching the exemplary aspects of the present invention.

FIG. 3 also illustrates, by way of example, three program development tools, tool1 310, tool2 311, and tool3 312, running in a wrapper mode. The wrapper can be a process (or thread) which forks the tool as a separate process (even thread) and then monitors the tool process for its behavioral aspects using standard operating system commands such as ps (in Unix). This enables memory consumption, CPU overload, tool-related process status and context switches, and semaphore use to be concurrently observed for tool-specific warning signals that can be escalated to the user.

For purposes of this disclosure, the wrapper tool is referred to as the tool itself, for convenience.

User response to such scenarios can be, for example, temporarily suspending the tool or putting the tool to sleep, running the tool in non-optimizing mode, freeing up resources elsewhere, by shutting down other processes, etc. Similarly, exceptions generated within the tool function itself (e.g., file-not-found, no read permissions, etc.) can be communicated by the tool sub-process for further handling by the wrapper process. Such communication means can use standard inter-process communication means such as, but not limited to, Java® RMI or sockets. As exemplarily described above, each of these tools can be, for example, compilers, linkers, library managers, or the like. The ordinarily skilled artisan would know and understand that the above exemplary tools are representative tools, and that the teaching of the present invention is not restricted to these exemplary tools in particular.

Modifying the running of a tool, e.g., to run in non-optimizing or non-debug mode (as the optimizing/debug mode may be consuming too many space/time resources) can involve changing its invocation command/flags in the build/make file. Such build remediation is supported in the present disclosure, as exemplarily described below.

Associated with each tool can be one or more IDE plug-ins, in this exemplary case, one for each of the displayed tools, 320 for tool1, 321 for tool2, and 323 for tool3. There is also exemplarily shown a dispatcher 330 which is used for coordinating message communication between the tools and their plug-ins. Each tool can have an interface subcomponent for communication with the dispatcher: 341 for tool1, 342 for tool2, and 343 for tool3.

It should be noted that each tool plug-in can freely access the resources of the IDE, including but not limited to, IDE sub-components and external services such as the Internet and databases that provide information for discovery and suggestion such as substitute libraries (smaller footprint), invocation commands/modes, etc. As exemplarily shown in FIG. 3, tool1 plug-in 321 accesses the UI component 301, tool manager 302, as well as the Internet 350. Tool2 plug-in, 322, accesses the tool manager 302. Tool3 plug-in, 323, accesses the tool manager 302, the project manager 303, and an external database 351.

Figure 4:
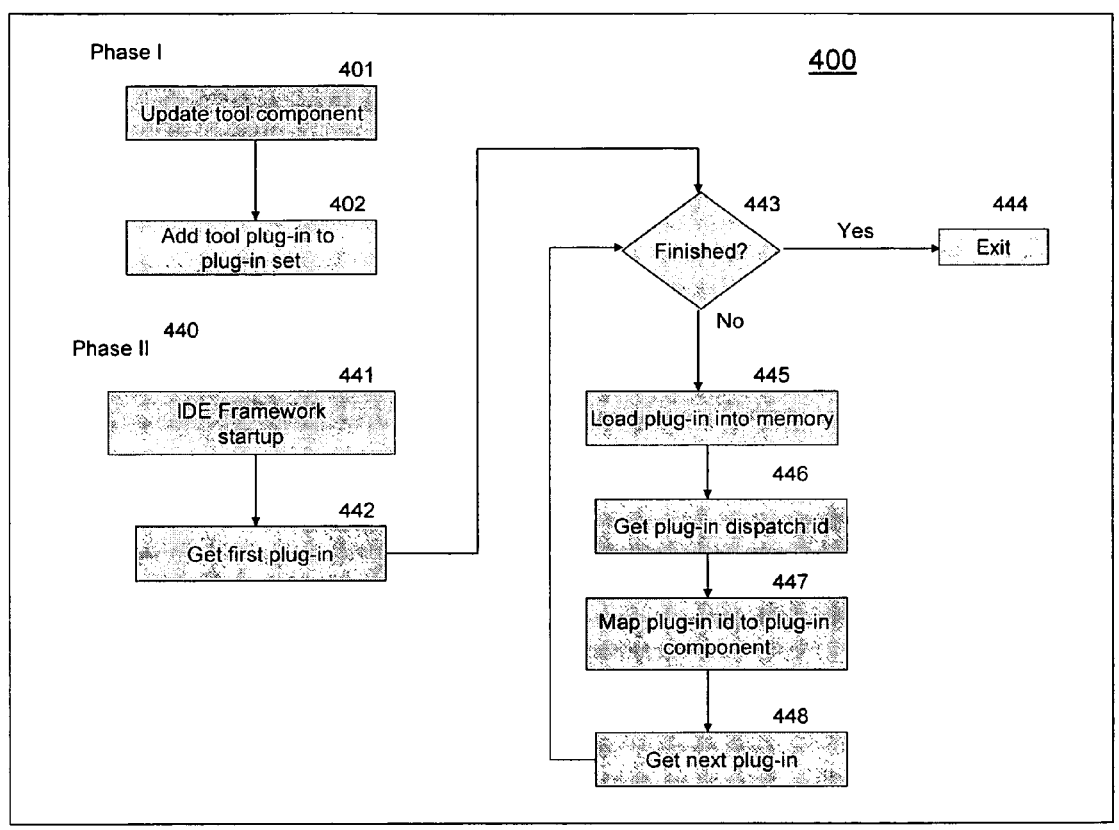
FIG. 4 exemplarily illustrates a block diagram of the logic flow 400 for adding tool assist plug-ins, according to an exemplary aspect of the present invention.

In FIG. 4, there are exemplarily shown processes for adding 400 and initializing plug-ins 440 within a development tool. Means for plug-in support are well-known in the software industry, and it is not the intention to define these well-known processes in detail within this exemplary teaching. The intention instead is to provide context for the remainder of the teaching.

Phase I 400 exemplarily illustrates the manual processes involved in updating a program development tool to introduce new plug-ins. Typically in this phase, new software components are acquired and installed co-resident to the software development tool. One component can include adding new tool components 401. For example, if new program development tools are now part of the development environment, these can be added (e.g., need to be added). Also, new plug-in support 402 can be added. In distinction to 401, 402 involves programs that interact more directly with the IDE framework, as exemplarily illustrated in FIG. 3, items 321, 322, 323.

The plug-in initialization process 440 can include steps to provide identification of plug-ins to the IDE framework 300. After the IDE framework is started 441, the list of known installed plug-ins can be traversed, starting with the first one 442. The list of known installed plug-ins can be found by several means, dependent on the means for plug-in installation. This can include scanning for well-known plug-in file types in specific directories, locating plug-in registration id's in a system registry, set by a given plug-in installation process, etc.

If the last plug-in has been processed 443, initialization can exit 444. If not, the plug-in can be loaded into memory 445. A unique id representing the plug-in can be obtained from the plug-in 446; the id to be used by the dispatcher to recognize which plug-in should process messages posted with the id. This id can be generated by a central id manufacturer, as for example GUIDs, and implanted within the plug-in at plug-in development. The dispatcher can then associate or map this id with the plug-in component which is now loaded into memory 447. The dispatcher can use this id as a means for routing messages to the correct plug-in. The next plug-in can be identified 448, with a return to asking if finished 443.

Figure 5:
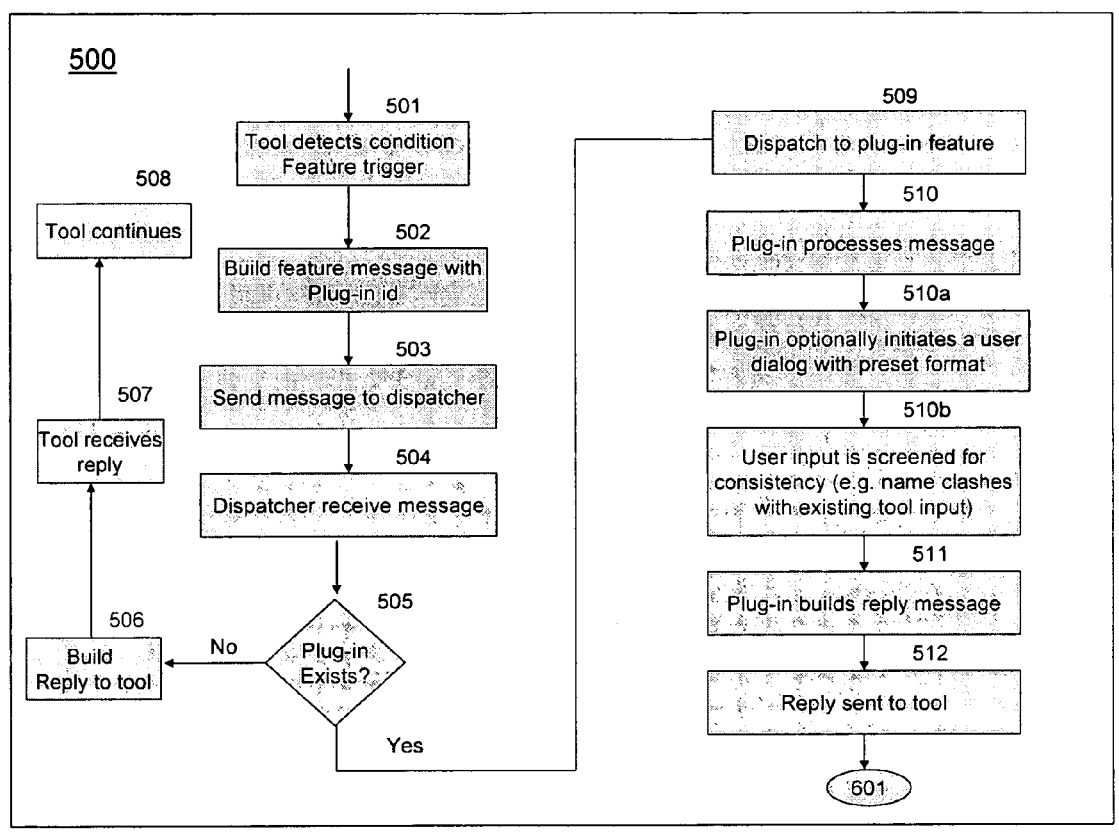
FIG. 5 exemplarily illustrates a block diagram of the logic flow 500 exercising a program development tool plug-in feature, according to an exemplary aspect of the present invention.
Figure 6:
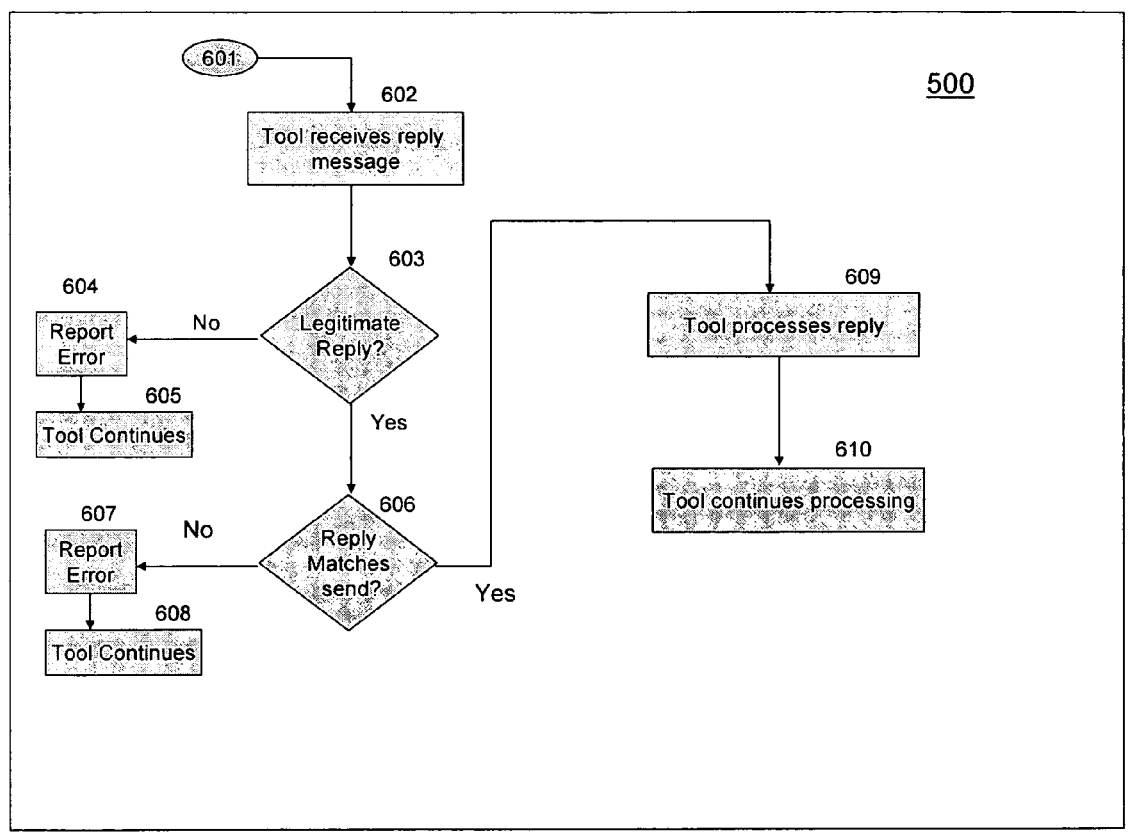
FIG. 6 exemplarily illustrates a block diagram for the continuation of the logic flow 500 exercising a program development tool plug-in feature, according to an exemplary aspect of the present invention.

There is exemplarily shown in FIGS. 5 and 6 the processes for processing a message in this development-tools-based plug-in system. The process can commence with a programming tool/wrapper detecting a condition that could benefit from using one of the plug-ins 501. The tools can be any one of, but not limited to, a compiler, debugger, linker, etc. or any other tool related to program development. The benefit the tool seeks can be of almost any varied sort, for example, access to user provided information, database information, or network or Internet accessible information, or launching of other tools, etc. The tool/wrapper then can build 502 a message to send to the dispatcher to invoke a specific plug-in to invoke a feature. The plug-in ID can be specified on the message. This and other information, such as message format and parameter types, can be pre-established and built into the tool itself. The message can be sent to the dispatcher 503, and the dispatcher can receive this message 504. The messaging can be done in any well-understood means, including message queuing, network messaging, etc. The dispatcher can analyze the message by looking at the plug-in ID, and checks if the plug-in is in the IDE framework 505. If it is not, the dispatcher can build and send a negative reply for the tool 506, indicating that the plug-in does not exist. The tool can receive the reply 507, and continue processing 508 with its own directive on behavior based on the absence of the feature.

If the dispatcher discerns 505 that the plug-in does exist, the dispatcher can send the message to the plug-in 509. The plug-in can process the message 510, and build a reply message 511. Intermediate steps in this can include problem presentation to the user in a standard format and initiating a dialog with the user for optional input, 510a. User input can include choice of menu options (e.g., alternative invocation commands/scenarios), or free-form input, all of which can be screened for internal consistency by the plug-in, such as lexing (lexical analysis) text input for collecting user-provided names and checking for name clashes with earlier tool input such as source code files. Other means for identifying user names can be explicit user identification of names and name-refactoring support for ensuring uniqueness. Once the dialog completes, the final, screened input, 510b, can be used to construct a reply message 511. This reply can be sent directly to the tool 512. The plug-in can direct the message to the tool if the identity of the tools and a means for sending the message there is specified, for example, on the original message received. This is a technicality, and is not the only means for returning a reply message. Other means can include, for example, sending the message to the dispatcher to return it to the originating tool/wrapper. In this exemplary case too, the return ID of the tool and means for returning the reply can be understood from encoded information on the originating message. All of these are but technicalities that the ordinarily skilled artisan in the art of component frameworks and/or messaging would know and understand. The logic continues to 601 of FIG. 6.

With reference again to FIG. 6, and continuing with 601, the tool can receive the reply message 602. If the reply is not legitimate 603, perhaps an errant message, an error 604 can be reported to the tool user or administrator, and the tool can proceed 605 to some processing commensurate to having received this error, for example, error recovery processing. The reply message can be checked to see if it matches a message sent by the tool 606. This check could be made by matching send/reply unique identifiers based, for example, on generated GUIDs. Techniques like this are well understood in the practice of using messaging systems. If the reply does not match the sent message from the tool, an error 607 is reported to the tool user or administrator, and the tool proceeds 608 to some processing commensurate to having received this error, for example, error recovery processing.

Having a valid reply to a valid message, the tool proceeds to process the reply information and processes in accordance to the tool semantic intentions of utilizing this information 609. After that, the tool continues processing 610.

As an example of changing tool invocation flags, the continued processing can include a use of the alternative settings, if such switchover of modes is permitted part-way during processing. Otherwise, the tool can break with an exception, causing failure of the build process and cause a concomitant remediation dialogue within which the build settings are modified to reflect the alternative tool invocation. Either scenario is based on actual tool invocation scenarios and causes change of the tool use process on the fly using the proposed teaching.

As a point of reference and distinction, the exemplary teachings of the present invention should not be taken as a recapitulation of devices such as intelligent program editors. Such devices are mainly source code input devices, and as opposed to compilers, linkers, etc., they do not directly produce end-result binaries. As source code input devices, such devices serve to correct a number of common program errors using only moderately superficial program information. They also serve as intermediate tools to the programming tools that provide end-result binaries. According to the exemplary aspects of the present invention, the assistance is provided at a deeper semantic layer, and more directly translates into end-result binaries. That is, the interaction of the exemplary teachings can be directly between the programming tool and the user, as opposed to between a program editor and user, after which usage, the source code is passed to the programming tool.

Based on this exemplary teaching, an extension for means of error remediation can be implemented wherein some known error remediation can be applied immediately without user dialog. These remediation techniques can be implemented as policy rules specifying the identified problem along with the type of change that needs to be made, using a combination of primitive editing action such as insertion, deletion, copy, and rename. Such rules can be kept in either a local or global data repository, and can be added or modified as discovered.

By way of example, consider the case wherein the error in question detects a set of undefined symbols which the user knows belongs to an include file not specified for the program. The remediation rule can specify an insertion of such include file based on the detection of some set of those symbols. This policy-based remediation can be implemented in addition to this framework of this patent in a way that one of ordinary skill in the art of program design and programming could do with little effort.

The ordinarily skilled artisan will recognize that functional and non-functional limitation errors, as described earlier, can be addressed through the exemplary aspects of the present invention. A configuration limitation, e.g. missing files, incorrect paths, can be corrected upon detection by the tools as exemplarily described in this teaching.

In non-functional cases, for example, it may be necessary for the user to interrupt a tool process. In this exemplary case, a service software interrupt, initiated by the user, can serve as a means for remediation. The service interrupt can engage the logic described in this exemplary teaching. The technique for providing this engagement would be clearly known and understood by the ordinarily skilled artisan in the art of program design and programming.

The present invention also recognizes that the underlying software framework described in the exemplary aspects can be applied to any interactive software system or environment which can provide access to a set of software processes, with the interactive software system providing execution cycles wherein a subset of comprising tools are executed. The effect of same is that error, limitations, or generally any informative information gleaned by any of these individual processes, analytical information, etc., can now be processes in accordance with this teaching, and said analytical information can be repaired, or addressed in any of prescriptive manners, i.e., remediated, by the same or similar techniques as exemplarily described herein.

Figures 7, 8:
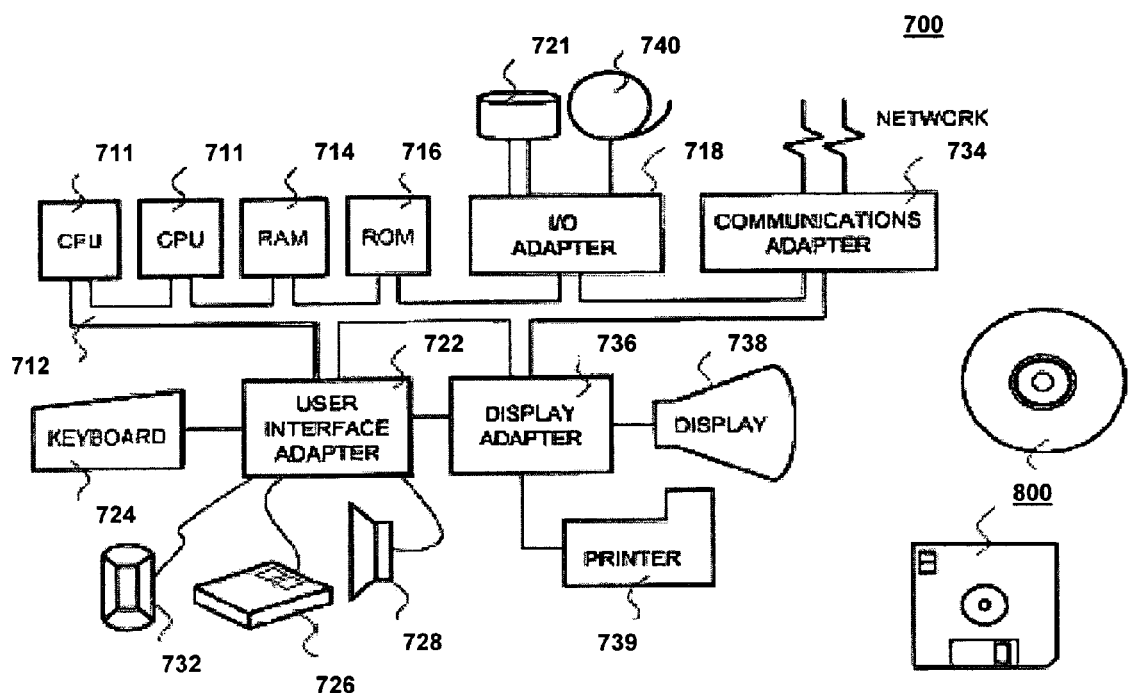
FIG. 7 illustrates an exemplary hardware/information handling system 700 for incorporating the exemplary features of the present invention therein.
FIG. 8 illustrates a signal bearing medium (e.g., storage medium 800) for storing/recording steps of a program of a method, according to the exemplary features of the present invention.

FIG. 7 illustrates an exemplary hardware/information handling system 700 for incorporating the present invention therein, and FIG. 8 illustrates a signal bearing medium 800 (e.g., storage medium) for storing steps of a program of a method according to the present invention.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a data storage disk/diskette 800 (FIG. 8), directly or indirectly accessible by the CPU 711.

Whether contained in the disk/diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary aspects, those skilled in the art will recognize that the invention is not limited to the exemplary features and can be practiced with modification within the spirit and scope of the appended claims.

Further, it is noted that, Applicants' intent is to encompass equivalents of all claim elements, even if amended later during prosecution.

What is claimed is:

1. A computer-implemented method for interactive software development processes in an interactive software system, the method comprising:

remediating, as executed by a processor on a computer, an execution cycle of said interactive software system based on analytical information from said software development processes in the interactive software system prior to a completion of the execution cycle of said interactive software system;

identifying said analytical information from said software development processes in the interactive software system prior to said completion of said execution cycle of said interactive software system; and initiating communication with at least one of a user and a support software to obtain said information to remedy one of said problems prior to the completion of execution cycle of said interactive software system, wherein said identifying comprises detecting a predetermined set of problems for which information can be obtained to remedy at least one of said problems prior to the completion of said execution cycle of said interactive software system.

2. The computer-implemented method according to claim 1, wherein said analytical information comprises:

at least one of a program development error and a limitation prior to the completion of the execution cycle of said interactive software system, and repairing at least one of the program development error and the limitation prior to the completion of the execution cycle of said interactive software system.

3. The computer-implemented method according to claim 1, wherein said method further comprises:

continuing said execution cycle of said interactive software system after performing said remediating.

4. The computer-implemented method according to claim 1, wherein said identifying comprises:

identifying at least one of a functional program development limitation and a non-functional program development limitation during different phases of said execution cycle of said interactive software system, and wherein said remediating comprises:

interactively repairing the at least one of the functional program development limitation and the non-functional program development limitation at said different phases of said execution cycle of said interactive software system.

5. The computer-implemented method according to claim 1, wherein an error policy is applied to the identified analytical information, and wherein, upon acceptance of the identified analytical information according to a qualification by said error policy, an error remediation of said error policy is applied to fix said identified analytical information.

6. A method of deploying computing infrastructure in which recordable, computer-readable code is integrated into a computing system, and combines with said computing system to perform the method according to claim 1.

7. A tangible readable storage medium tangibly embodying a program of recordable, machine-readable instructions executable by a digital processing apparatus to perform the method according to claim 1.

8. A computer-implemented method for programming environment engagement and enhancement in an interactive program development system for interactive software development processes, the method comprising:
- detecting, as executed by a processor on a computer, an environment-specific condition prior to termination of an execution cycle of a programming tool;
- engaging at least one of a user and a support software to obtain information related to said tool-specific condition;
- based on a result of said engaging, invoking ancillary means for processing said environment-specific condition; and
- continuing execution of said programming environment after invoking said ancillary means for processing said environment-specific condition.

9. The computer-implemented method according to claim 8, wherein said tool-specific condition comprises at least one functional exception, and
wherein said functional exception includes at least one of: a file-not-found, a CPU overload, an excessive stack size, a blocked process, and a frequent context switch.

10. The computer-implemented method according to claim 8, further comprising:
- providing an interface for at least one of plugging in different system tools, allowing individual tool-user dialogs to be described to the method, and allowing standardized presentation of diverse dialogs via the interface.

11. The computer-implemented method according to claim 8, further comprising:
- automatically changing a program variable name to a unique name, regardless of lexical/dynamic scoping conventions of tool input.

12. An interactive software system for interactive software development processes, the system comprising:
- a remediating unit, as executed by a processor on a computer, that remediates an execution cycle of said interactive software system based on analytical information from said software development processes in the interactive software system prior to a completion of the execution cycle of said interactive software system;
- an identifying unit that identifies said analytical information from said software development processes in the interactive software system prior to said completion of said execution cycle of said interactive software system, said identifying unit providing an input to said remediating unit; and
- a communication unit that initiates communication with at least one of a user and a support software to obtain said information to remedy said at least one of said problems prior to the completion of execution cycle of said interactive software system,
wherein said identifying unit detects a predetermined set of problems for which information can be obtained to remedy at least one of said problems prior to the completion of said execution cycle of said interactive software system.

13. The system according to claim 12, wherein said analytical information comprises:
- at least one of a program development error and a limitation prior to completion of the execution cycle of said interactive software system, and
wherein said remediating unit repairs at least one of the program development error and the limitation prior to the completion of the execution cycle of said interactive software system.

14. A interactive software development system, for interactive software development processes, including a plurality of programming tools, the system comprising:
- error detecting means, as executed by a processor on a computer, for identifying a software development error prior to completion of an execution cycle of said software development system;
- error repairing means, as executed by said processor, for repairing the software development error prior to the completion of the execution cycle of said software development system;
- an identifying means that identifies analytical information from said software development processes in the interactive software system prior to said completion of said execution cycle of said interactive software system; and
- a communication means that initiates communication with at least one of a user and a support software to obtain said information to remedy said at least one of problems prior to the completion of execution cycle of said interactive software system,
wherein said identifying means detects a predetermined set of problems for which information can be obtained to remedy at least one of said problems prior to the completion of said execution cycle of said interactive software system.

15. The system according to claim 14, further comprising:
- interface means for initiating communication with at least one of a user and a support software to obtain information to remedy said identified software development error prior to the completion of the execution cycle of said software development system.

16. The system according to claim 14, wherein one of said programming tools comprises:
- at least one of a compiler, a linker, a library builder, a library manager, a debugger, and a program editor.

* * * * *